Figures 1, 2:
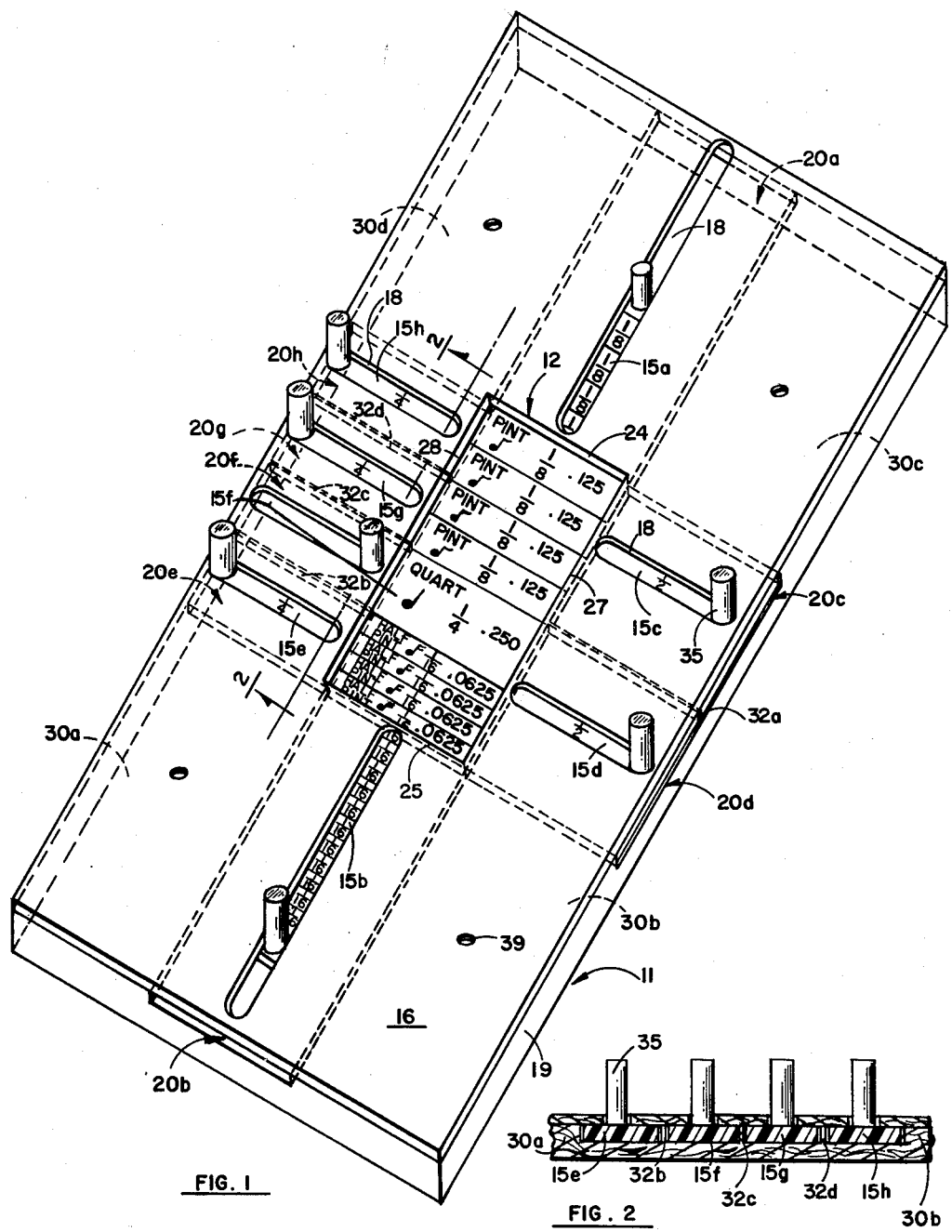

July 14, 1964     R. J. MADER     3,140,552
DEVICE FOR TEACHING THE CONCEPT OF FRACTIONS
Filed Oct. 29, 1962

INVENTOR.
ROBERT J. MADER

BY Edward A. Sokolski

ATTORNEY

United States Patent Office 3,140,552
Patented July 14, 1964

3,140,552
DEVICE FOR TEACHING THE CONCEPT OF
FRACTIONS
Robert J. Mader, 1607 Hickory St., Torrance, Calif.
Filed Oct. 29, 1962, Ser. No. 233,825
6 Claims. (Cl. 35—31)

This invention relates to a device for teaching the concept of fractions and more particularly to such a device which visually displays to the student how various combinations of fractional portions may be combined to make for the whole.

In teaching the fractional concept, it has been found to be very helpful to visually display to the student the physical combination of fractional units in the form of blocks, discs, strips and the like to make for the whole. In most of the devices of the prior art, this is accomplished by utilizing sectional pieces which may be combined on a backboard and removed as desired to permit other combinations to be made. Such devices have the shortcoming in that the removable pieces are readily lost and misplaced. Other devices using slidable strips tend to be overly complicated in their construction making their fabrication unduly involved and expensive and their teaching somewhat difficult for the neophyte to comprehend. Many of these devices also lack versatility in their pedagogical application, being limited to only one type of measurement.

The device of this invention overcomes the shortcomings of the prior art by providing means for teaching the fractional concept in which there is no requirement for the utilization of removable sections. The device of the invention is of very simple and economical construction and is adapted to teach fractions in conjunction with several types of measurement.

This improvement is achieved by utilizing slide plates for representing fractional portions, various combinations of these slide plates being positioned in a window formed in a holder unit. The window represents the whole and the various slide plates when they are combined to fill up the window illustrate how various fractional portions are added to make for the whole. The slide plates are mounted for slidable motion in channels formed in the holder unit. The slide plates while they can be readily positioned in the holder unit are not removable therefrom except on disassembly of the device for repair or replacement purposes.

It is therefore an object of this invention to provide an improved educational device for teaching fractions.

It is a further object of this invention to provide a device for teaching fractions of simplified construction and more economical to fabricate.

It is another object of this invention to provide a device for teaching fractions which is of greater versatility than prior art devices.

It is still a further object of this invention to provide a device for teaching fractions which does not utilize loose pieces which are prone to be lost or misplaced.

Other objects of this invention will become apparent from the following discussion taken in connection with the accompanying drawings of which, FIG. 1 is a perspective view of a preferred embodiment of the device of the invention, and FIG. 2 is a cross sectional view of the embodiment shown in FIG. 1 as taken along the plane indicated by the line 2—2 in FIG. 1.

Referring now to FIGS. 1 and 2, a preferred embodiment of the device of the invention is illustrated. Holder unit 11 has a front plate portion 16 and a rear plate portion 19. Front plate 16 has a window 12 and a plurality of slots 18 formed therein. Each slot 18 runs from a position proximate to one of the sides of the window in a direction normal to the associated window side towards the edge of front plate 16. Back plate 19 has a plurality of channels 20a–20h formed therein which are contiguous to window 12. A first pair of these channels 20a and 20b are equal in width to the length of sides 24 and 25 of window 12. A second group of these channels 20c and 20d which are adjacent to side 27 of the window, each have a width which is half the length of side 27 while a third group of these channels 20e–20h which are adjacent to window side 28 each have a width which is equal to one quarter the total length of side 28. Channels 20a and 20b are formed by raised corner sections 30a–30d which are integrally formed with back plate 19. Channels 20c–20h are formed by means of septums 32a–32d which are attached to back plate 19 working in conjunction with the corner sections 30a–30d.

Each channel has an associated one of slide plates 15a–15h slidably mounted therein. Each slide plate has a width substantially equal to that of its mounting channel and a length such that when it is completely inserted into window 12 it will reach the side of the window opposite to that at which it was inserted. Slide plate 15a is marked into eight equal divisions each of which is one eighth of the size of window 12 while slide plate 15b is marked into sixteen equal divisions each of which is one sixteenth the size of the window. Each of divisions of slide plates 15a and 15b is marked not only ⅛ and ¹⁄₁₆ respectively but also with an equivalent quantity in decimal form, liquid measurement and musical notation. Other systems of measurement may of course also be marked on the slide plates if so desired. Each of slide plates 15c and 15d is adapted to fill up one half of the window when inserted therein while each of slide plates 15e–15h is adapted to fill up one quarter of the window. These slide plates are also marked to represent the equivalent in decimal form, liquid measurement and musical notation. Thus, each of slide plates 15c–15h represents a single predetermined fractional portion of the whole while slide plates 15a and 15b are each marked into segments which can be inserted into the window to various amounts to represent multiples of predetermined fractional portions. The use of such segmented slide plates along one axis of the device in conjunction with non-segmented plates along axes normal to this first axis enables increased versatility and teaching capacity in the device of the invention.

Each of the slide plates 15a–15h has a knob 35 attached thereto which protrudes through an associated one of slots 18. Knobs 35 are used to selectively position the slide plates in the window to show various fractional combinations which will make up the whole.

The device may be fabricated of plastic, wood, cardboard, metal or any other suitable material. As indicated in FIG. 1, front plate 16 and back plate 19 are separate pieces which are joined together by means of screws 39. Such two piece construction enables the removal and replacement of the slide plates if so desired. Thus, the slide plates may be replaced if damaged, or different plates representing different fracitonal divisions may be substituted for plates 15a and 15b to vary the teaching presented. Also plates showing different systems of measurement may be substituted. Each plate representing a particular fractional unit or particular group of units may be colored a separate distinctive color to facilitate ready identification by the student. The operation of the device of the invention is clearly illustrated in FIG. 1. In the particular example illustrated, slide plate 15f is completely inserted into the window with slide plate 15a being inserted into the window to the extent of four ⅛ segments, slide plate 15b being inserted to the extent of four ¹⁄₁₆ segments, thereby completely filling the window. This pictorially shows the student that ¼ plus ⅛ plus ¹⁄₁₆ is equal to 1 or the whole; or a quart plus four pints plus four half pints is equal to a gallon or the whole; or .25 plus .125 plus .125 plus .125 plus .125 plus .0625 plus .0625 plus .0625 plus .0625 is equal to 1 or the whole; or a quarter note plus four eighth notes, plus four sixteenth notes is equal to a musical measure or the whole. The student, of course can combine a great variety of slide units to fill the window to thoroughly acquaint himself with the fractional concept.

The device of the invention may be utilized to teach fractioning in all types of weights and measures in addition to the particular types illustrated.

Thus, the device of this invention provides a simple yet highly effective means for teaching the fractional concept. A maximum fractional unit capacity is provided by utilizing both vertical and horizontal slide plates. Versatility is afforded by marking the slide plates in several systems of measurement and by making the plates replaceable with other plates showing still additional types and fractions of measurement. Further, the use of loose pieces is eliminated, thereby minimizing the chances of the loss or misplacement of such pieces.

While this invention has been described and illustrated in detail, this is intended by way of illustration and example only and not by way of limitation, the spirit and scope of the invention being limited only by the terms of the following claims.

I claim:

1. A device for teaching the concept of fractions comprising a holder unit having oppositely positioned front and back plates,
    said front plate having a window and a plurality of slots formed therein, each of said slots running from a position proximate to one of the sides of said window in a direction substantially normal to the associated window side,
    said back plate having a plurality of channels formed therein, each of said channels being positioned opposite an associated one of said slots and running in substantially the same directions thereas, the portion of said back plate opposite said window forming a continuation of said channels,
    a separate slide plate slidably mounted in each of said channels, each of said slide plates being adapted to represent a fractional portion of said window, at least one of said slide plates being mounted for motion along a first axis normal to one of the sides of said window, at least another one of said slide plates being mounted for motion along an axis normal to said first axis, said one of said slide plates being marked into segments, and
    knob means attached to each of said slide plates and protruding through an associated one of said slots for selectively positioning said slide plates in said window,
    whereby various combinations of said slide plates can be made to completely fill said window.

2. A device for teaching the concept of fractions comprising a substantially flat holder unit,
    said holder unit having a window and a plurality of slots formed in one broad surface thereof, each of said slots running from a position proximate to a side of said window in a direction substantially normal to the associated window side,
    said holder unit further having a plurality of channels formed therein, each of said channels being positioned opposite an associated one of said slots and running in substantially the same directions thereas, said channels continuing into the portion of said holder unit opposite said window,
    a pair of said channels being located on opposite sides of said window along a first axis normal to said opposite sides of said window, the others of said channels being located on opposite sides of said window along axes normal to said first axis,
    a separate slide plate slidably mounted in each of said pair of channels, each of said slide plates being substantially equal in length and width to said window and being marked into divisions which are fractional portions of said window,
    a plurality of slide plates each having a width which is a first predetermined fractional portion of the length of said window slidably mounted in the others of said channels on one side of said window,
    a plurality of slide plates each having a width which is a second fractional portion of the length of said window slidably mounted in the others of said channels on the side of said window opposite said one side, and
    knob means attached to each of said slide plates and protruding through an associated one of said slots for selectively positioning said slide plates in said window,
    whereby various combinations of said slide plates are made to completely fill said window.

3. The device as recited in claim 2 wherein each said slide plate representing a particular fractional portion of said window has a separate distinctive color.

4. The device as recited in claim 2 wherein said holder has a front and back plate, said window and said slots being formed in said front plate, said channels being formed in said back plate, said front plate being removably attached to said back plate.

5. In a device for teaching the concept of fractions, a substantially flat holder unit having a substantially rectangular window and a plurality of slots formed in one side thereof, each of said slots running from a position proximate to one of the sides of said window in a direction normal to the associated window side,
    a plurality of channels being formed in said holder unit in the portion thereof opposite said one side, each of said channels being located opposite an associated one of said slots and running in substantially the same direction thereas, said channels being contiguous with said window, a first pair of said channels running in directions normal to a first pair of opposite sides of said window respectively and being substantially equal in width to the length of said first pair of sides, second and third groups of said channels running in directions normal to the third and fourth sides of said window respectively, the channels of said second group of channels being of an equal width which is a first predetermined fractional portion of the length of said third and fourth sides of said window, the channels of said third group of channels being of an equal width which is a second predetermined fractional portion of the length of said third and fourth sides of said window, the number of channels in said second and third groups of channels respectively times the respective widths of each channel thereof being equal to the length of said third and fourth sides of said window respectively.
    a separate slide plate slidably mounted in each of said channels, said slide plates being substantially equal in width to the associated channel, the slide plates mounted in said first pair of channels being at least equal in length to the length of said window and each being marked into a separate number of equal divisions, the slide plates mounted in said second and third groups of channels being at least equal in length to the width of said window, and
    knob means attached to each of said slide plates and protruding through said slots for selectively positioning said slide plates in said window.

6. In a device for teaching fractions,
    first and second slide plates each being marked off into a predetermined number of equal segments,
    a first group of slide plates, the slide plates of said first group having a first predetermined dimension and being marked to represent this dimension,
    a second group of slide plates, the slide plates of said second group having a second predetermined dimension and being marked to represent this dimension, and holder means for slidably supporting said slide plates, said holder means having a window formed therein, the marked portions of said first and second slide plates having a width and length substantially equal to that of said window, said first and second plates being located along a first axis normal to a pair of opposite sides of said window, the slide plates of said first and second groups being located along axes substantially normal to said first axis, said first predetermined dimension being at least equal in length to the width of said window and a first predetermined fraction of the length of said window in its width, said second predetermined dimension being at least equal in length to the width of said window and a second predetermined fraction of the length of said window in its width.

References Cited in the file of this patent
UNITED STATES PATENTS

| | | |
|---|---|---|
| 1,773,670 | Girlich | Aug. 19, 1930 |
| 2,914,865 | Hall | Dec. 1, 1959 |